(12) United States Patent
Caruthers et al.

(10) Patent No.: US 12,157,977 B2
(45) Date of Patent: Dec. 3, 2024

(54) WATER RESISTANT PAPER AND SOLUTION FOR PRODUCING SAME AND BUILDING STRUCTURE EMPLOYING SAME

(71) Applicant: Agriboard International, LLC, Wichita, KS (US)

(72) Inventors: Eddie Caruthers, Wallingford, CT (US); Frank Laster, Leedey, OK (US); Larry Ryan, Yukon, OK (US)

(73) Assignee: Agriboard Green Building Systems, LLC, Wichita, KS (US)

( * ) Notice: Subject to any disclaimer, the term of this patent is extended or adjusted under 35 U.S.C. 154(b) by 562 days.

(21) Appl. No.: 17/322,413

(22) Filed: May 17, 2021

(65) Prior Publication Data
US 2022/0010494 A1    Jan. 13, 2022

Related U.S. Application Data

(62) Division of application No. 16/275,495, filed on Feb. 14, 2019, now Pat. No. 11,008,708.

(51) Int. Cl.
*D21H 21/20*    (2006.01)
*C09D 7/40*    (2018.01)
(Continued)

(52) U.S. Cl.
CPC ............... *D21H 21/20* (2013.01); *C09D 7/61* (2018.01); *C09D 7/63* (2018.01); *C09D 7/69* (2018.01);
(Continued)

(58) Field of Classification Search
CPC ... C09D 7/69; C09D 7/61; C09D 7/63; C09D 125/10; C09D 147/00; D21H 21/00;
(Continued)

(56) References Cited

U.S. PATENT DOCUMENTS

| 3,388,082 | A | * | 6/1968 | Rodgers, Jr. | ............ | C08B 11/02 536/91 |
| 2014/0272404 | A1 | * | 9/2014 | Shake | ................. | C04B 41/4535 428/221 |

OTHER PUBLICATIONS

Paint & Coatings Industry, Omnova Launches Several Coatings Innovations, Apr. 12, 2016, https://www.pcimag.com/articles/101902-omnova-launches-several-coatings-innovations, Accesed Jan. 13, 2024 (Year: 2016).*

* cited by examiner

*Primary Examiner* — Vincent Tatesure
(74) *Attorney, Agent, or Firm* — Young Basile Hanlon & MacFarlane, P.C.

(57) ABSTRACT

A waterproof architectural element comprising an elongated panel member composed of compressed fibrous material having a first planar surface and an opposed second planar surface. At least one elongated cellulose layer is composed of Kraft paper having paper basis weight between 30 and 90 pounds and an average thickness between 0.003 and 0.009 inches. The elongated substrate has a first planar face and an opposed second planar face. A polymeric layer overlies at least a portion of the first planar face of the elongated substrate and comprises a polymeric blend of between 50 and 80 wt. % styrene butadiene copolymer and 0.2 and 3 wt. % of a cellulose ether compound. The cellulose ether compound comprises hydrogen or an alkyl group selected from the group consisting of methyl, ethyl, hydroxyethyl, hydroxypropyl carboxymethyl, hydroxyethyl methyl, hydroxypropyl and between 30 and 50 wt. % calcium carbonate and water.

8 Claims, 2 Drawing Sheets

(51) Int. Cl.
*C09D 7/61* (2018.01)
*C09D 7/63* (2018.01)
*C09D 125/10* (2006.01)
*C09D 147/00* (2006.01)
*D21H 19/38* (2006.01)
*D21H 19/46* (2006.01)
*D21H 19/52* (2006.01)
*D21H 19/58* (2006.01)
*D21H 19/64* (2006.01)
*D21H 19/66* (2006.01)
*D21H 27/34* (2006.01)

(52) U.S. Cl.
CPC ......... *C09D 125/10* (2013.01); *C09D 147/00* (2013.01); *D21H 19/385* (2013.01); *D21H 19/46* (2013.01); *D21H 19/52* (2013.01); *D21H 19/58* (2013.01); *D21H 19/64* (2013.01); *D21H 19/66* (2013.01); *D21H 27/34* (2013.01)

(58) Field of Classification Search
CPC ...... D21H 19/385; D21H 19/46; D21H 19/52; D21H 19/58; D21H 19/64; D21H 19/66
USPC ............................................ 162/124; 442/59
See application file for complete search history.

WATER RESISTANT PAPER AND SOLUTION FOR PRODUCING SAME AND BUILDING STRUCTURE EMPLOYING SAME

CROSS-REFERENCE TO RELATED APPLICATIONS

This application is a divisional of U.S. patent application Ser. No. 16/275,495, filed on Feb. 14, 2019.

TECHNICAL FIELD

The present disclosure is directed to chemical compositions for imparting water resistance to cellulosic materials, and more particularly, the present disclosure is directed to solutions and methods for imparting water resistance to paper sheet stock.

BACKGROUND

Structural components composed of compressed agricultural fiber structural panels provide a sustainable and ecologically friendly building component that are both sturdy and economical. Compressed agricultural fiber structural panels offer advantages of construction speed and efficiency together with lowering construction waste and Leadership Energy and Environmental Design (LEED) advantages. Compressed agricultural fiber panels have a negative carbon footprint, high insulation values, and the ability to produce a tight building envelope.

Compressed agricultural fiber structural panels include a compacted fibrous core composed of a suitable cellulosic material such as various processed vegetative material derived from agricultural fiber such as straw, or the like. The compressed cellulosic material can be surrounded by a containment material such as in industrial packing paper such as Kraft liner paper. The compressed or compacted cellulosic core can have a suitable density and dryness sufficient to provide the structural stability and strength necessary to meet acceptable building and load standards.

In order to maintain the structural integrity of the compressed fiber structural panels, it is necessary to avoid exposure to water after the installation process. Kraft paper is an ecologically friendly and light weight option for the containment layer but can permit water incursion. Heretofore, the use of such architectural components has been limited to use in internal wall structures and the like. Use of such structures for exposed weather bearing walls has been extremely limited due to the degradation caused by water incursion.

Thus, it would be desirable to provide a water-based, environmentally friendly chemical composition that can impart water resistance to fibrous materials such as Kraft paper and the like. It would also be desirable to provide a polymeric material that can impart a durable water-resistant coating to Kraft paper and the like. It is also desirable to provide an architectural structure composed of a compressed fibrous material surrounded by a containment material that provides the advantages of Kraft paper while providing a containment surface that is integral to the core element and provides enhanced water resistance.

SUMMARY

A coating composition that includes between 20 and 50 wt. % of a styrene butadiene copolymer, between 20 and 40 wt. % of calcium carbonate having a median particle size distribution between 10 μm to 100 μm, between 0.2 and 1.0 wt. % of a cellulose ether compound, between 0.3 and 1.0 wt. % of an ammonia compound, between 0 and 1.0 wt. % of an anti-foaming agent, and water.

A composite structure that includes an elongated substrate having a first planar face and a second planar face opposed to the first planar face. The elongated substrate is composed of Kraft paper having a paper basis weight between 30 and 90 pounds, an average thickness between 0.003 and 0.009 inches, and a polymeric layer overlying at least a portion of the first planar face of the elongated substrate. The coating composition includes between 20 and 50 wt. % of a styrene butadiene copolymer, between 20 and 40 wt. % of calcium carbonate having a median particle size distribution between 10 μm to 100 μm, between 0.2 and 1.0 wt. % of a cellulose ether compound, between 0.3 and 1.0 wt. % of an ammonia compound, between 0 and 1.0 wt. % of an anti-foaming agent, and water. The coating composition, when dried, is composed of between 50 and 80 wt. % of a styrene butadiene copolymer, between 0.2 and 3 wt. % of a cellulose ether compound, between 30 and 50 wt. % of calcium carbonate.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
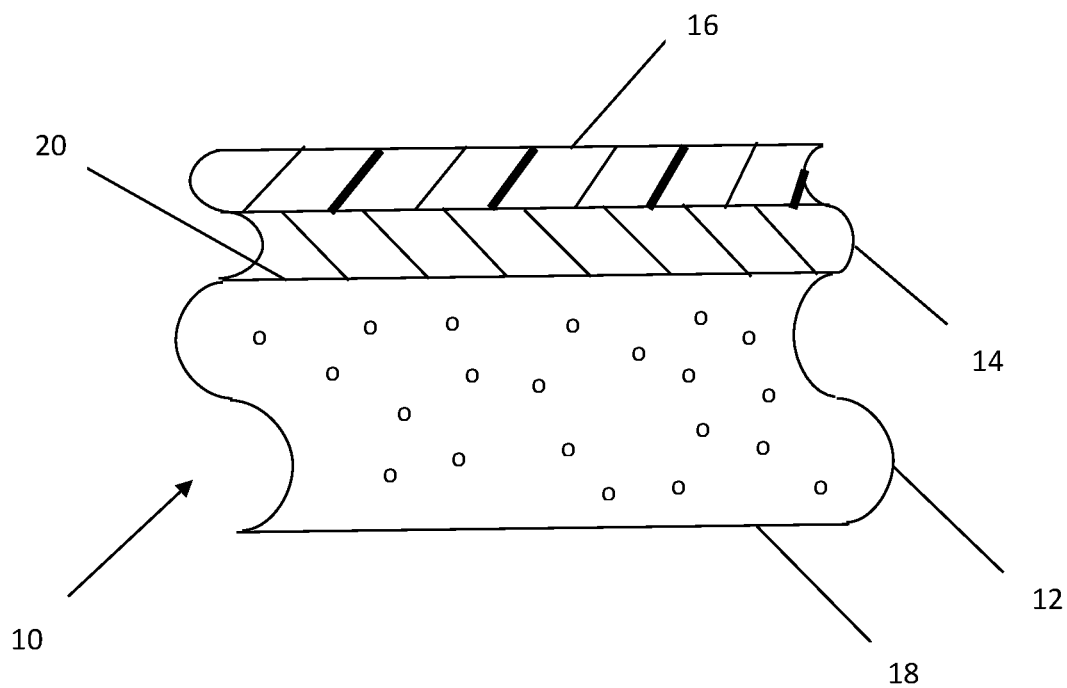
FIG. 1 is a cross-section of a representative compressed fiber board structural component having an embodiment of the composition as disclosed herein and applied thereon.

The present disclosure is predicated on the unexpected discovery that the novel polymeric formulation as disclosed herein can form a durable coating that is resistant to exposure to environmental challenges such as water. It is also predicated on the discovery that the polymeric formulation as disclosed herein can form a bonded coating overlying a cellulose-containing substrate that is both durable and resistant to environmental challenges. It has also been discovered that the polymeric composition as disclosed herein when applied to a containment layer overlying a compressed structural fiberboard composed of agriculturally derived fiber material can integrally bond with the containment layer in a manner that strengthens the containment layer and imparts environmentally imperviousness to the associated structural member.

Disclosed herein is a polymeric composition that can be applied on a suitable cellulose-containing substrate as a liquid material and harden after application to a polymeric layer that adheres and/or integrates with the associated substrate. The coating composition that is employed includes a styrene butadiene copolymer dispersed in an aqueous carrier, together with calcium carbonate having a median particle size distribution sufficient to disperse into the aqueous carrier and a cellulose ether component. The coating composition also includes an ammonia compound and an optional anti-foaming agent.

Application onto the suitable cellulose-containing substrate can be accomplished by any suitable manner as by roller application, brushing, or the like. The applied polymeric composition can be applied as a liquid that adheres to the cellulose-containing substrate and hardens into a polymeric coating upon evaporation of the aqueous carrier. Without being bound to any theory, it is believed that the resulting polymeric composition includes binding sites that interact with cellulose-containing material in the substrate to form chemical bonds between the cellulose-containing material and functional groups present on the resulting polymeric coating. It is also theorized that the applied material penetrates into regions of the cellulose-containing substrate, particularly those proximate to the first planar face of the cellulose-containing substrate and polymerizes therearound.

In certain embodiments, the coating composition includes a styrene butadiene copolymer that is present in an amount between 20 and 50 wt. %. The styrene butadiene copolymer employed can have the general formula:

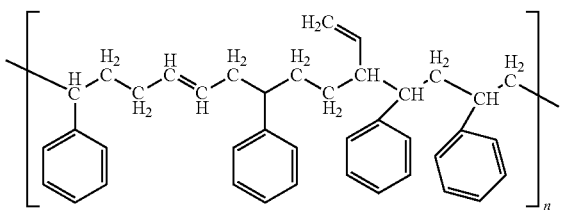

in which n is an integer between 50 and 15,000. In certain embodiments, the styrene butadiene copolymer can have a random copolymer. It is contemplated that the styrene butadiene copolymer that is employed can have a number average molecular weight between 50,000 and 500,000 in certain embodiments. Where desired or required, the styrene butadiene copolymer in the coating composition as applied can be present in an aqueous carrier in either a dispersed or emulsified state, or mixture of the two. One non-limiting example of a styrene butadiene copolymeric material suitable for use in the composition as disclosed herein is commercially available from Omnova Solutions Incorporated under the trade name PLIOTEC® WPM120. It is believed that PLIOTEC® WPM120 is a milky white liquid proprietary composition having a Brookfield viscosity between 50-400 cps (LVT #2 spindle, 60 rpm@25° C.). The liquid has a pH between 8 and 9 and has a solids content between 51% and 53% composed in whole or in part of a styrene butadiene copolymer having a specific gravity of 1.02 and a glass transition temperature (Tg) midpoint of 5° C. PLIOTEC® WPM120 material is free of alkylphenol ethoxylate components and is believed to be a styrene butadiene emulsion.

In certain embodiments, the styrene butadiene copolymer can be present in the application composition in a concentration between 20 and 40 wt. %.

When the styrene butadiene copolymeric component is introduced into the application solution as PLIOTEC® WPM120, it is contemplated that the PLIOTEC® liquid material can constitute between 40 and 50 wt. % of the application solution in certain embodiments, while in some embodiments, the PLIOTEC® WPM120 component can be present in the application solution in an amount between 41 and 46 wt. %.

The application solution can also include a cellulose compound dispersed in the liquid in a concentration between 0.003 and 1.0 wt. %. It is contemplated that in certain embodiments, the cellulose can be present in an amount between 0.3 to 1.0 wt. %, while in some embodiments, the cellulose ether can be present in an amount between 0.3 and 0.75 wt. %.

The cellulose ether can have the general formula:

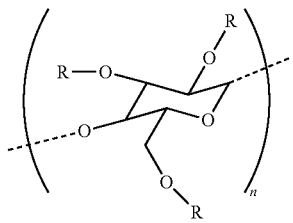

wherein each R is hydrogen or an alkyl group selected from the group consisting of methyl, ethyl, hydroxyethyl, hydroxypropyl carboxymethyl, hydroxyethyl methyl, hydroxypropyl, and mixtures thereof, wherein n is an integer between 50 and 1000.

In certain embodiments, it is contemplated that each R will be hydrogen or an alkyl group selected from the group consisting of methyl, ethyl, hydroxyethyl and mixtures thereof. Non-limiting examples of commercially available cellulose ethers include METHOCEL commercially available from Dow Chemical Company. Suitable cellulose ethers compounds will be those which can impart a viscosity between 400 cps and 2000 cps when added to an aqueous medium. Non-limiting examples of suitable commercially available cellulose ethers include METHOCEL 228. Without being bound to any theory, it is believed that the cellulose ether component serves to prevent water separation during polymerization and to maintain the various solid components in solution.

The coating composition, as disclosed herein, also includes a calcium carbonate component. The calcium carbonate component employed will have a median particle size between 1 μm to 1000 μm. In certain embodiments, it is contemplated that the calcium carbonate component will have an average particle size between 100 μm and 300 μm. Where desired or required, the calcium carbonate can be a combination of various grades of calcium carbonate and can have a mesh size between 80 μm and 60 μm.

The calcium carbonate component can be present in an amount between 20 and 40 wt. %. In certain embodiments, the calcium carbonate component can be present in an amount between 25 and 35 wt. %. Without being bound to any theory, it is believed that the fine particulate calcium carbonate is integrated into the polymerizing material as the aqueous component evaporates, and the styrene butadiene copolymer presently dispersed in the aqueous carrier polymerizes in contact with the cellulose substrate.

The aqueous application composition as disclosed herein also includes an ammonia compound present in an amount between 0.3 and 1.0 wt. %. In certain embodiments, the ammonia compound is present in an amount between 0.3 and 0.7 wt. %. The ammonia compound can be selected from the group consisting of ammonia, ammonium persulfate, ethylenediamine, and mixtures thereof. In certain embodiments, it is contemplated that the ammonia compound will be ammonia. Without being bound to any theory, it is contemplated that the ammonia compound modulates the polymerization reaction that occurs with removal of the aqueous component after application.

The application composition can also include between 0 and 1.0 wt. % of at least one anti-foaming agent. The anti-foaming agent can be one suitable for inhibiting solution foaming in the composition as the material is applied to the cellulose-containing substrate. It is also contemplated that the anti-foaming agent can inhibit foaming during formulation. Where desired or required, the anti-foaming agent can be a compound selected from the group consisting of fatty alcohols, fatty acid soaps, fatty acid ethers, silicone-based defoamers and mixtures thereof. Non-limiting examples of suitable antifoaming agents include polyoxyethylene octyl phenol ether (Polyoxyethylene Octylphenol Ether) and the heavy paraffin refined oil hydrotreated (Hydrotreated heavy paraffinic distillate) 10~20: The mixture was mixed in a weight ratio of 80 to 90 preferably used and may include 0.1 to 3% by weight.

Figure 2:
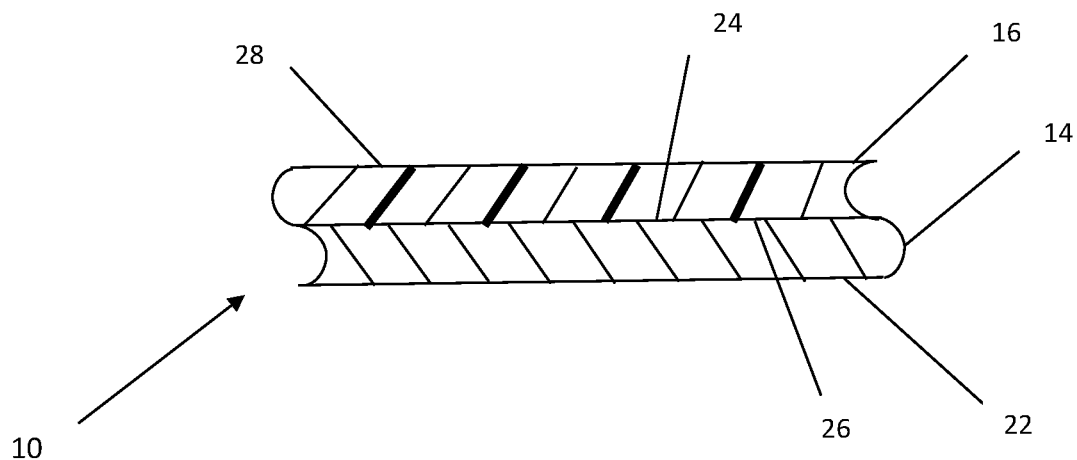
FIG. 2 is a cross-section of the polymeric composition as disclosed herein and applied thereon.

Also disclosed herein is a composite structure 10 as shown in FIGS. 1 and 2. The composite structure 10 includes an elongated substrate 14. The elongated substrate 14 can have any suitable length and width as well as thickness. In certain embodiments, the thickness of the layer of the elongated substrate 14 will be between 0.003 inches and 0.050 inches. In certain embodiments, the thickness of the elongated substrate 14 can be between 0.003 and 0.009 inches.

It is contemplated that the elongated substrate 14 will be composed of a material that is both light weight and durable. In certain embodiments, the elongated substrate layer 14 can be composed in whole or in part of a suitable cellulosic material such as Kraft paper. The Kraft paper employed in the elongated substrate 14 can have a paper basis weight between 10 and 100 pounds in some embodiments, while the paper basis weight can be between 30 and 90 pounds in some embodiments.

The elongated substrate 14 can have a first planar face 24 and a second planar face 22. The second planar face 22 is opposed to and generally oriented substantially parallel to the first planar face 24. In the embodiment depicted in FIGS. 1 and 2, the first planar face 24 is configured to be oriented in an outwardly facing direction relative to an associated structural or elongated panel member 12. The opposed second planar face 22 is configured to be oriented inwardly and can be configured with a suitable adhesive or the like to facilitate attachment and/or bonding to the associated structural member 12 such as a board made of compressed agricultural fibers.

The composite structure 10 also has a polymeric layer 16 that overlies at least a portion of the first planar face 24 of the elongated substrate 14. The polymeric layer 16 has a first planar face 28 that is outwardly facing and is sufficiently durable to withstand exterior environmental challenges such as rain water and the like. The polymeric layer 16 also has an opposed planar region 26 that is affixed to the outwardly oriented first face 24 of the substrate layer 14 in a generally integral manner.

The polymeric layer 16 can have a thickness suitable to prevent water incursion or migration through to the substrate 14. In certain embodiments, the polymeric layer 16 will have a thickness between 0.001 inches and 0.005 inches. It is also contemplated that a portion of the polymeric material applied to the elongated substrate 14 can penetrate into the outer region of the cellulosic material of the elongated substrate 14 forming a composite composed of polymeric material and substrate (not shown).

The polymeric layer 16 can be composed of a solidified polymeric material that comprises the following: between 50 and 80 wt. % of a styrene butadiene copolymer; between 0.2 and 3 wt. % of a cellulose ether; and between 30 and 50 wt. % calcium carbonate. In certain embodiments, the styrene butadiene copolymer is polymerized in a blended relationship with the calcium carbonate component and the cellulose ether component, the cellulose ether component having the general formula:

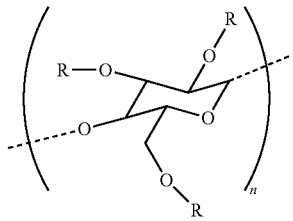

wherein each R is hydrogen or an alkyl group selected from the group consisting of methyl, ethyl, hydroxyethyl, hydroxypropyl carboxymethyl, hydroxyethyl methyl, hydroxypropyl; and wherein n is integer between 50 and 1000.

The elongated panel member 12 has a first outwardly oriented face 20 and an opposed second inwardly oriented face 18. The substrate layer 14 can be affixed to the first outwardly oriented face 20 of the elongated panel member 12 by any suitable means. In many embodiments, it is desirable to affix the substrate layer 14 in a manner that does not compromise the structural integrity of the substrate layer 14. In certain embodiments, a heat-activated polymeric adhesive layer is interposed between the second inwardly oriented face 18 of the substrate layer 14 and the first outwardly oriented face 20 of the elongated panel member 12.

The elongated panel member 12 is composed of compressed agricultural fibers. Non-limiting examples of such materials are those found in U.S. Pat. Nos. 5,945,132; 6,143,220; and 8,052,842, the specifications of which are incorporated by reference herein. Where desired or required, the elongated panel member 12 can include suitable fittings, joists, and other edge elements to facilitate assembly into the finished structure. The substrate layer 14 can overlay the various fitting and end joists in a manner that contains the compressed fiber material of the elongated panel member 12 with the polymeric layer 16 overlying both.

The outwardly oriented face 28 of the polymeric layer 16 may be painted and have other decorative coatings adhered thereto. Without being bound to any theory, it is believed that the calcium carbonate component integrates into the styrene-butadiene copolymer after the material has been applied to the substrate layer or material 14. It is also theorized that the calcium carbonate component integrated in the polymeric matrix provides binding sites that strengthen the resulting polymer and can enhance adhesion of later applied coating compositions such as paints and the like.

Where a roughened or more stucco-like surface is desired, it is contemplated that texturing materials can be incorporated into the polymeric matrix prior to application of the composition on the first planar face 24 of the substrate layer or material 14. It is also considered with the purview of the present disclosure to incorporate various aesthetic enhancements where desired or required. Non-limiting examples of suitable texturing materials include Portland cement components, silica sand, micronized plastic beads, and other geometric shapes and the like. Non-limiting examples of suitable aesthetic materials can include various pigmented flakes and the like. Where employed, it is contemplated that the texturing material can be present in an amount between 0 and 15 wt. %, with certain embodiments having amounts between 2 and 7 wt. %. Where pigmenting agents are employed, it is contemplated that they can be present in an amount between 0 and 5 wt. %.

Where desired, the polymeric layer 16 can be composed of an inner sublayer proximate to the substrate layer 14 that is composed of the aforementioned composition. Overlying the inner sublayer can be at least one outer layer that incorporates one or more of the texturizing and/or aesthetic enhancing components.

Without being bound to any theory, it is also believed that the construct as disclosed herein exhibits and imparts impact and water resistance both during construction and when employed in built structures.

Figure 3:
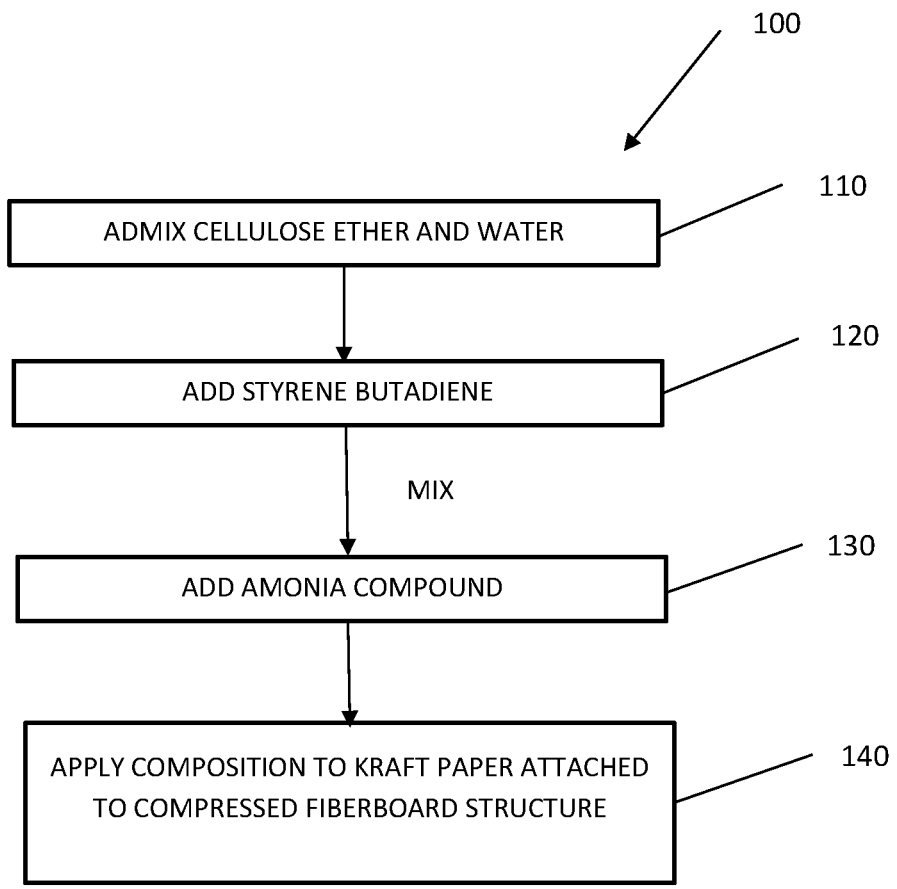
FIG. 3 is a process diagram of the preparation of the structural component as disclosed herein.

The composition as disclosed herein can be formulated according to the following process 100, as shown in FIG. 3. An admixture of a cellulose ester compound and water, as shown in step 110, can be formed by integrating cellulose ester having the general formula:

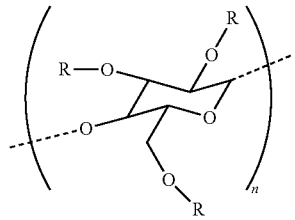

wherein each R is hydrogen or an alkyl group selected from the group consisting of methyl, ethyl, hydroxyethyl, hydroxypropyl carboxymethyl, hydroxyethyl methyl, hydroxypropyl, and wherein n is an integer between 50 and 1000. The cellulose ester compound can be added in an amount sufficient to provide a composition viscosity between 2000 and 6000 cps, with composition viscosity ranges between 2000 and 4000 cps being employed in certain embodiments. Addition and integration can be accomplished by medium to low shear mixing between 100 and 400 rpm, with 100 to 250 rpm being employed in certain embodiments. The amount of cellulose ester compound admixed into the water can be sufficient to provide a liquid application composition having between 0.003 and 1.0 wt. % of cellulose ether compound in certain embodiments.

Once the material is admixed, a sufficient quantity of an aqueous emulsion composed of between 40 and 50 wt. % of an anionic styrene butadiene copolymer having a specific gravity between 1.0 and 1.10 is added to the resulting composition in an amount sufficient to reduce the composition viscosity to a level between 1000 and 1500 cps, as shown in step 120. One non-limiting example of a suitable styrene butadiene emulsion is PLIOTEC® WPM 120. The styrene butadiene emulsion can be added with mixing under medium to low shear at a speed between 100 and 400 rpm in certain embodiments. In certain embodiments, it is contemplated that the quantity of styrene butadiene copolymer added to the reaction mixture will be that sufficient to provide a styrene butadiene copolymer in an amount between 20 and 50 wt. % of the resulting coating composition as applied.

After the styrene butadiene copolymer is thoroughly integrated, an ammonia compound can be added to the admixture in an amount between 0.3 and 1.0 wt. %, as shown in step 130. The ammonia compound can be selected from the group consisting of ammonia, ammonium persulfate, ethylenediamine, and mixtures thereof.

Calcium carbonate can be added simultaneously or subsequent to the addition of the ammonia compound. The calcium carbonate can be particulate material having a median particle size between 1 μm to 1000 μm in certain embodiments and between 100 μm and 300 μm in some embodiments. It is contemplated that the amount of calcium carbonate added can be between 20 and 40 wt. %.

The composition can also include suitable defoamers in an amount between 0 and 0.5 wt. % which can be added as desired during the product formulation.

The resulting composition is stable and can be stored for up to 12 months. The resulting composition can be applied to a suitable Kraft paper substrate by rolling, spraying, brushing etc., as shown in step 140, and hardens to a solid uniform water resistant coating. The craft paper substrate can be affixed in an overlying relationship to at least one surface of a suitable board construct composed of compressed agricultural fibers as described above.

The following example is provided to further illustrate the present disclosure. It is provided for illustrative purposes and is not to be construed as a limitation of the claims or the disclosure in general.

Example I

In order to assess the performance of the coating composition and components prepared including at least one layer of the composition as disclosed herein, the following example has been provided.

A coating composition is prepared by admixing sufficient cellulose compound under the trade name METHOCEL 228 commercially available from Dow Chemical in water with low to medium shear mixing at a speed of 100 rpm to provide a cellulose compound concentration of 0.5 wt. % and a composition viscosity of approximately 3000 cps. It is believed that the METHOCEL 228 material is an aqueous material composed of cellulose ether and having an initial composition viscosity between 2000 and 6000 cps.

Once the material is admixed, a volume of PLIOTEC® WPM 120 anionic styrene butadiene emulsion is added to the solution with mixing under medium to low sheer at a speed of 200 rpm. The amount added is sufficient to reduce the solution viscosity to 1000 cps and provide styrene copolymer in the end composition of 40 wt. %. After the styrene butadiene copolymer is thoroughly integrated, ammonia is added to the admixture at 0.3 wt. % based on the compositional weight with the simultaneous addition of particulate calcium carbonate having a median particle size of 200 μm to provide a composition containing 30 wt. % of calcium carbonate.

The resulting composition is stable and can be stored for up to 12 months.

Example II

The composition outlined in Example I is applied to a 12 inches×12 inches Kraft paper substrate having a paper basis weight of 40 lbs and an average thickness of 0.006 inches by roller application. The composition is applied to a thickness of 0.002 inches and allowed to dry for an interval of three hours and is physically inspected. The applied coating has a generally smooth surface that is dry to the touch and provides generally uniform adhesion to the underlying Kraft paper.

Example III

A second layer of the composition outlined in Example I is applied in overlying relationship to the first applied coating layer to the contrast prepared in Example II by roller application to a thickness of 0.002 inches to produce a total coating layer of 0.004 inches. The applied coating layer is allowed to dry for an interval of three hours and is physically inspected. The applied coating layer has a generally smooth surface that is dry to the touch and adheres to the underlying layer.

Example IV

The composition outlined in Example I is applied to a 5 feet×5 feet panel of compressed wheat straw that is obtained from Agriboard Industries of Vernon, Texas. The compressed wheat straw panel is prepared by adhesively applying a piece of Kraft paper to one five-foot surface of the compressed wheat straw panel. The Kraft paper material applied has paper basis weight of 40 lbs. and an average thickness of 0.006 inches. The composition is applied to a thickness of 0.002 inches and allowed to dry for an interval of three hours and is physically inspected. The applied coating layer has a generally smooth surface that is dry to the touch.

The resulting construct is further inspected. The underlying compressed wheat straw panel, the Kraft paper, and the applied coating layer form an integral unit that can be employed in further construction activities.

Example V

For purposes of analysis, the construct prepared in Example IV is compared with a wheat straw panel of similar dimensions and a wheat straw panel having Kraft paper adhesively attached. It is found that the Kraft paper-to-panel bond strength and delamination resistance is increased in constructs having the layer of the coating composition of Example I and those described elsewhere in this disclosure.

The three test pieces are tested for impact resistance by dropping a 50-gram round pellet from vertical heights of 5 feet and 10 feet, respectively, onto a planar surface of the respective panels positioned vertical to the test piece dropped. Impact dimpling is detected in the non-covered compressed wheat straw panel and in the Kraft paper-covered panel but not in the construct as outlined having the coating composition defined in Example I. This construct is visually examined after impact testing, and no appreciable cracking is observed at or near the impact site.

To test water repellency, test pieces according to the three constructions outlined are each positioned horizontally, perpendicularly, and at a 45° angle, and 25 ml portions of water are poured onto the planar surface. The water is slowly absorbed in the uncovered panel member and into the Kraft paper in the uncovered Kraft paper construct. The water appears to pool on the surface of the coated construct. The water samples cause similar effects at perpendicular and angular orientations as noted above. It is concluded that the coating composition imparts water resistance to the coated construct.

While the present disclosure has been described in connection with what is presently considered to be the most practical and preferred embodiment, it is to be understood that the present disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A coating composition comprising:
   between 20 and 50 wt. % of an anionic styrene butadiene copolymer, present as a carboxylated styrene butadiene having a glass transition temperature midpoint of 5° C.;
   between 20 and 40 wt. % of calcium carbonate, the calcium carbonate having a median particle size between 100 μm and 300 μm;
   between 0.003 and 1.0 wt. % of a cellulose ether compound, the cellulose ether compound having the general formula:

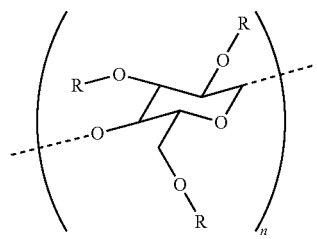

or

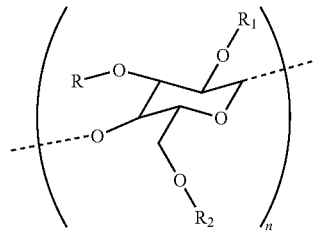

wherein R is hydrogen or an alkyl group selected from the group consisting of methyl, ethyl, hydroxypropyl carboxymethyl, hydroxyethylmethyl, hydroxypropyl, and wherein $R_1$ is hydrogen or an alkyl group selected from the group consisting of methyl, ethyl, hydroxypropyl carboxymethyl, hydroxyethyl methyl, hydroxypropyl and mixtures thereof and wherein $R_2$ is selected from the group consisting of hydroxypropyl carboxymethyl, hydroxyethyl methyl, hydroxypropyl and mixtures thereof;
   wherein n is an integer between 50 and 1000;
   between 0.3 and 1.0 wt. % of an ammonia compound, the ammonia compound selected from the group consisting of ammonia, ammonium persulfate, ethylenediamine, and mixtures thereof;
   between 0 and 1.0 wt. % of an anti-foaming agent selected from the group consisting of fatty alcohols, fatty acid soaps, fatty acid ethers, silicone-based defoamers, and mixtures thereof; and
   water.

2. The composition of claim 1 wherein the styrene butadiene copolymer is present in a concentration between 20 and 40 wt. % and has a repeating monomer unit between 50 and 500,000.

3. The composition of claim 2 wherein the cellulose ether compound is selected from the group consisting of methyl hydroxypropyl cellulose, ethyl hydroxypropyl cellulose, and mixtures thereof and is present in an amount between 0.003 and 0.75 wt. %.

4. The composition of claim 1 wherein the anti-foaming agent is present in an amount between 0.1 and 0.6 wt. % and is a siloxane.

5. The composition of claim 1 wherein the ammonia compound is present in an amount between 0.2 and 0.5 wt. %.

6. The composition of claim 1 wherein the calcium carbonate is present between 25 and 35 wt. %.

7. The composition of claim 1 further comprising at least one texturing agent.

8. The composition of claim 1, and wherein the cellulose ether compound is hydroxypropyl methyl cellulose ether.

\* \* \* \* \*

UNITED STATES PATENT AND TRADEMARK OFFICE
CERTIFICATE OF CORRECTION

| | | |
|---|---|---|
| PATENT NO. | : 12,157,977 B2 | Page 1 of 1 |
| APPLICATION NO. | : 17/322413 | |
| DATED | : December 3, 2024 | |
| INVENTOR(S) | : Eddie Caruthers, Frank Laster and Larry Ryan | |

It is certified that error appears in the above-identified patent and that said Letters Patent is hereby corrected as shown below:

In the Claims

In Column 3, after Line 16, please replace the image with the following image:

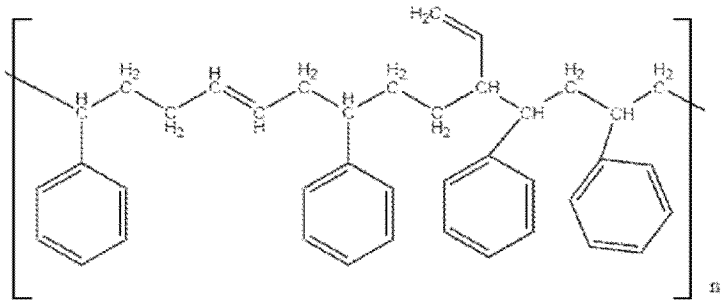

Signed and Sealed this
Seventh Day of January, 2025

Derrick Brent
*Acting Director of the United States Patent and Trademark Office*